United States Patent [19]

Overy et al.

[11] 4,414,781
[45] Nov. 15, 1983

[54] TURBINE SANDER

[75] Inventors: Colin Overy; Anthony J. Langenberg, both of Brockville, Canada; Arthur Powell, Baldwin; Stanley Rodowsky, Jr., Baltimore, both of Md.

[73] Assignee: Black & Decker Inc., Newark, Del.

[21] Appl. No.: 298,308

[22] Filed: Sep. 1, 1981

[51] Int. Cl.³ .................. B24B 23/00; B24B 47/06
[52] U.S. Cl. .................. 51/170 MT; 51/174
[58] Field of Search ......... 51/170 T, 170 R, 170 MT, 51/170 PT, 177, 174, 180; 419/119, 116, 163, 126, 205, 184, 202, 190, 196; 15/375, 387, 354

[56] References Cited

U.S. PATENT DOCUMENTS

| | | | |
|---|---|---|---|
| 2,340,437 | 2/1944 | Stoner | 15/351 |
| 2,342,905 | 2/1944 | Smellie | 415/119 |
| 2,683,276 | 7/1954 | Olsen | 15/387 |
| 2,701,892 | 2/1955 | Mingus | 15/375 |
| 2,904,817 | 9/1959 | Brennan | 15/375 |
| 3,071,799 | 1/1963 | Jepson et al. | 15/387 |
| 3,246,359 | 4/1966 | Griffiths | 15/323 |
| 3,262,199 | 7/1966 | Magarian | 30/133 |
| 3,722,147 | 3/1973 | Brenner | 51/170 T |

Primary Examiner—Roscoe V. Parker
Attorney, Agent, or Firm—R. B. Sherer; Harold Weinstein; Charles E. Yocum

[57] ABSTRACT

A turbine-driven sander includes a minimum of one-piece sealed housing members so interconnected as to form a nozzle, a turbine chamber, and a valve chamber. A plurality of elongated support members are integrally formed on a housing member. Fasteners are inserted in the elongated support members to clamp the housing members together. A flap valve mounted in the valve chamber opens the turbine chamber to a source of vacuum, thereby driving a turbine rotatably mounted in the turbine chamber. This rotation in turn vibrates a platen through a direct-drive system. The platen is supported upon one of the housing members by two platen support members. A noise attenuation system at the front end of the housing includes a two-passage nozzle which is curved to interrupt the line of sight from a turbine air inlet to the turbine. A side branch resonator communicates with the nozzle via noise-attenuating holes in a cover plate located above the nozzle. The nozzle configuration and the resonator coact to attenuate turbine air inlet noise and turbine vane noise.

7 Claims, 7 Drawing Figures

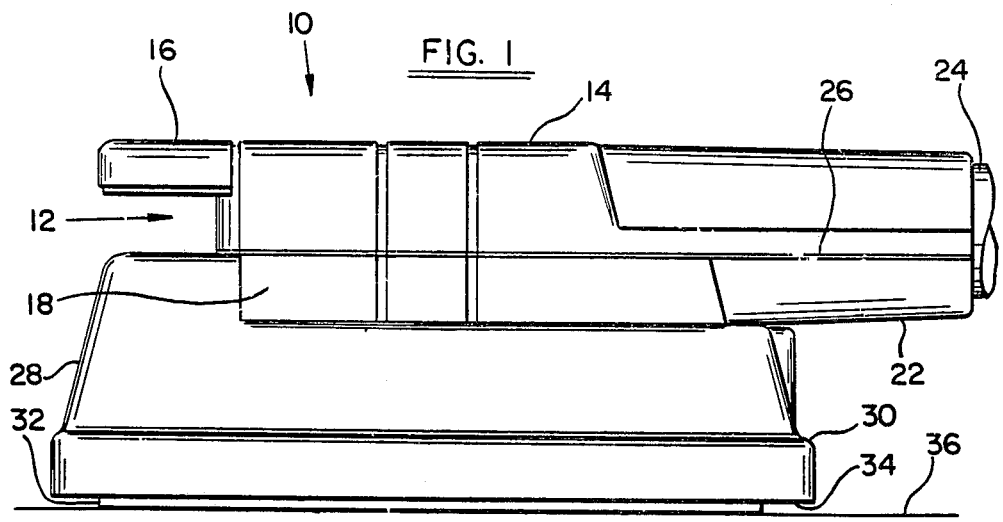
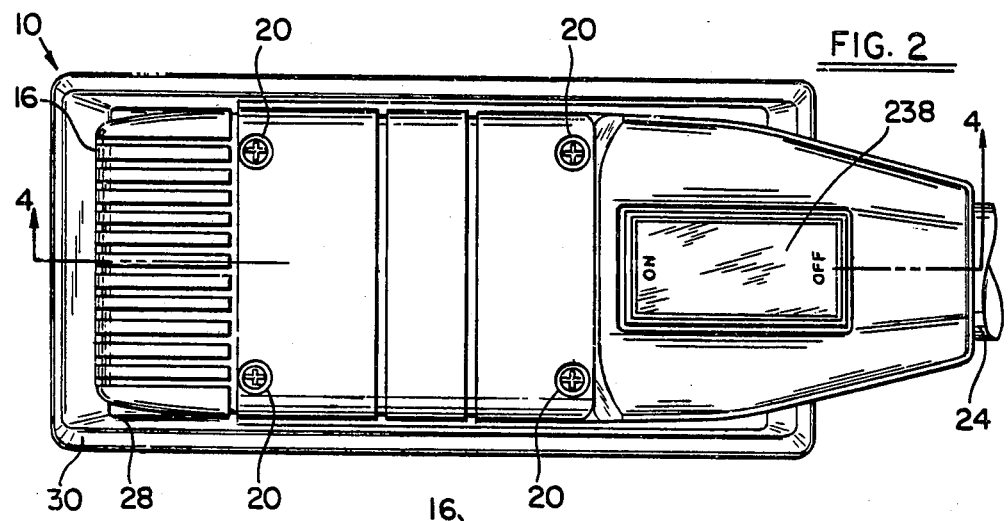
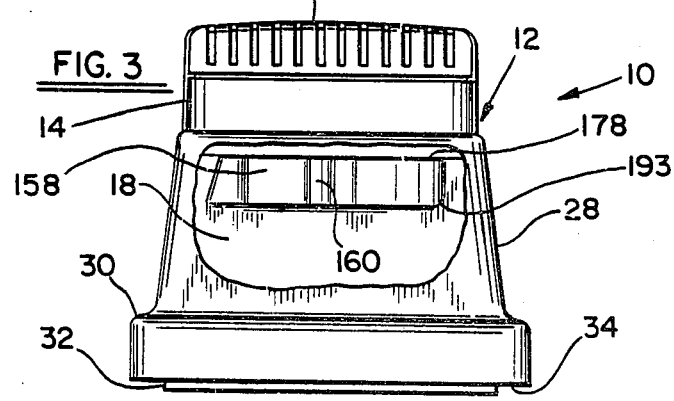

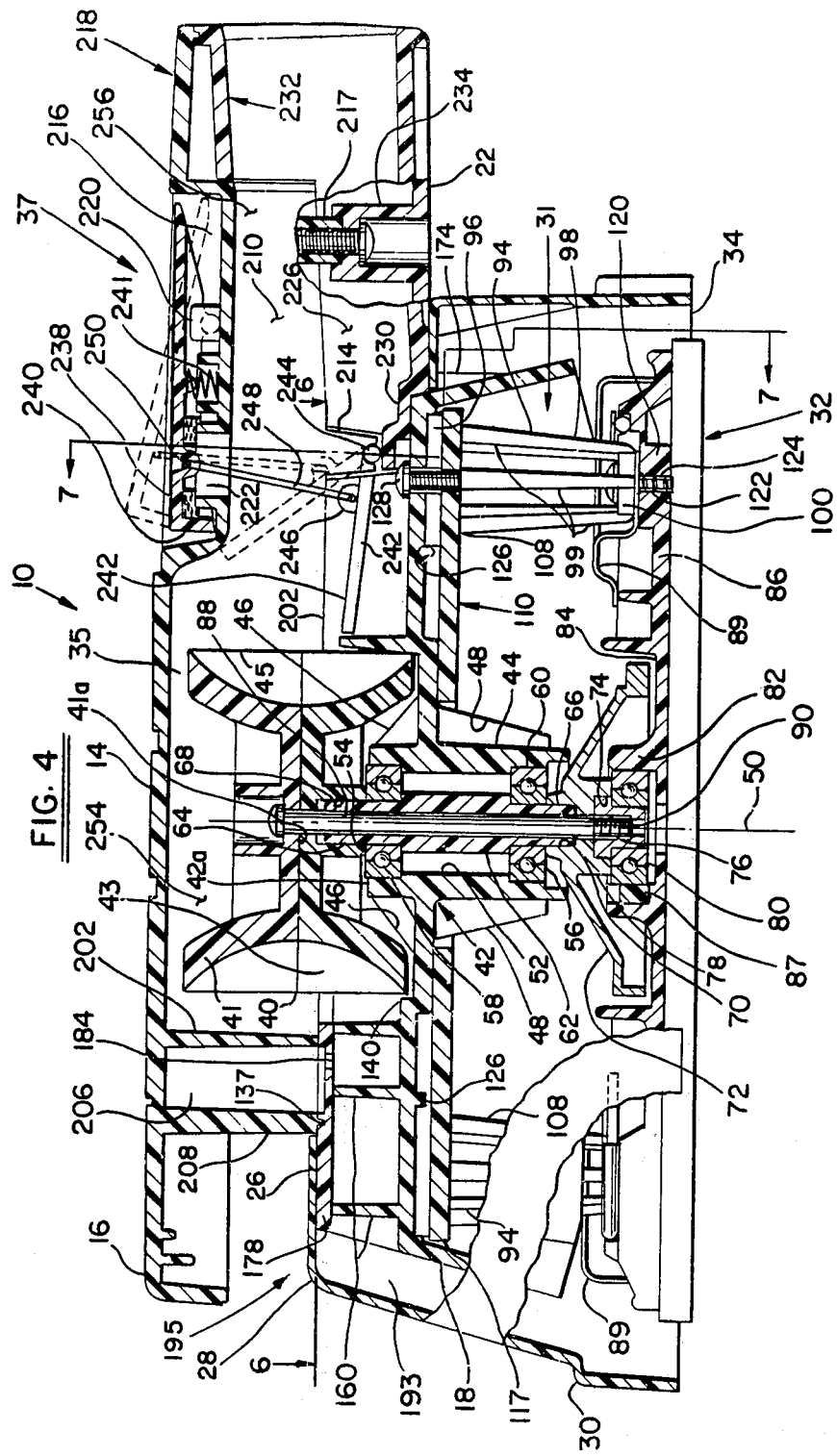

TURBINE SANDER

BACKGROUND OF THE INVENTION

1. Field of the Invention

This invention relates to air-powered tools, and more particularly to a hand-held turbine-driven orbital sander employing a minimum of housing parts to form a nozzle, turbine air chambers, and a valve chamber. The housing also provides an attenuation system which simultaneously reduces turbine air inlet noise and turbine vane noise.

2. Description of the Prior Art

Air-driven abrading devices have generally required the use of several housing components and their attendant extra hardware thereby increasing their relative size and costs of manufacture. U.S. Pat. No. 3,722,147 discloses a turbine powered abrading device for walls and floors. A dome-shaped housing encloses a turbine which draws air in an axial flow upwardly from the worksurface. There is no "nozzle" per se, and any "on-off" controller must be located in the conduit member and away from the unit. Also, its housing does not provide turbine vane or air inlet noise attenuation, nor does it permit hand-held operation.

Other air-powered devices suffer similar disadvantages. U.S. Pat. No. 2,904,817 shows a turbine-powdered rug brush in which a valve plate must be secured in one of several positions by an external control knob. Although the rug brush is enclosed by two housing members, it contains no structural members to withstand vertical pressure such as is generated in a hand-held sanding tool, nor do its housing members provide a turbine noise attenuation system.

U.S. Pat. No. 3,262,199 shows a turbine-powered hair clipper. The nozzle includes a single curved air passage designed to direct air tangentially into the turbine, but it does not interrupt the line of sight from the nozzle entrance to the turbine. Also several housing components are required to enclose the turbine, cutting mechanism, and nozzle. Two housing members must first be removed from a mounting base before an operator can access the screws, as for cleaning the turbine chamber. Furthermore, the housing does not define a valve chamber.

Patents describing vacuum cleaners which generate air flow, but which are not themselves air-driven include the following: U.S. Pat. No. 3,246,359, which teaches an electric motor-driven vacuum cleaner in which an air inlet is integral with one housing member, but which lacks a valve chamber; U.S. Pat. No. 2,342,905, which shows the use of a plurality of perforations in a muffler, but also indicates that the perforations must be used in conjunction with sound-deadening material such as felt; and U.S. Pat. No. 2,340,437, which teaches the use of a resonant chamber and communicating slots in a vacuum cleaner muffler. However this muffler must match the volume of the resonant chamber to an entire range of frequencies, there being no single dominant wavelength. Also neither of the last two mentioned patents teach the use of a resonant chamber in combination with means for attenuating air inlet noise, nor do they show the use of a nozzle to form a noise attenuation system.

SUMMARY OF THE INVENTION

A housing for a turbine-driven tool includes three members which interfit to form a nozzle, a turbine chamber, and a valve chamber. Molded integrally in two of the members are posts which simultaneously provide structural strength ease of alignment, and fastening means, and enhance opportunities for mass-production.

It is an object of the present invention to provide a housing for a turbine-driven tool which overcomes the prior art disadvantages; which is simple, economical and reliable; which uses three housing members to define a turbine chamber and a valve chamber; which are fastened together using at least one elongated support member formed on a housing member; which defines a nozzle; which contains turbine inlet noise attenuation means; which includes means for interrupting the line of sight from an air inlet to the turbine chamber; which is formed by two curved converging passages; which coact through a plurality of noise attenuation holes in a removable flashed nozzle cover plate with means for attenuating turbine vane noise; which includes a side branch resonator; and which has a depth related to the wavelength of the sound generated by the turbine vanes.

Other objects and advantages will be apparent from the following description of one embodiment of the invention; the novel features will be particularly pointed out hereinafter in the claims.

BRIEF DESCRIPTION OF THE DRAWINGS

The invention is illustrated in the accompanying drawings in which:

FIG. 1 is a side elevational view of a sanding pool embodying the present invention.

FIG. 2 is a plan view of the sanding tool embodying the present invention.

FIG. 3 is a front elevational partially cutaway view of the sanding tool of FIG. 1, illustrating the turbine air inlet.

FIG. 4 is a side elevational sectional view, partially cutaway, taken along line 4—4 of FIG. 2.

DESCRIPTION OF THE PREFERRED EMBODIMENT

Figure 5:
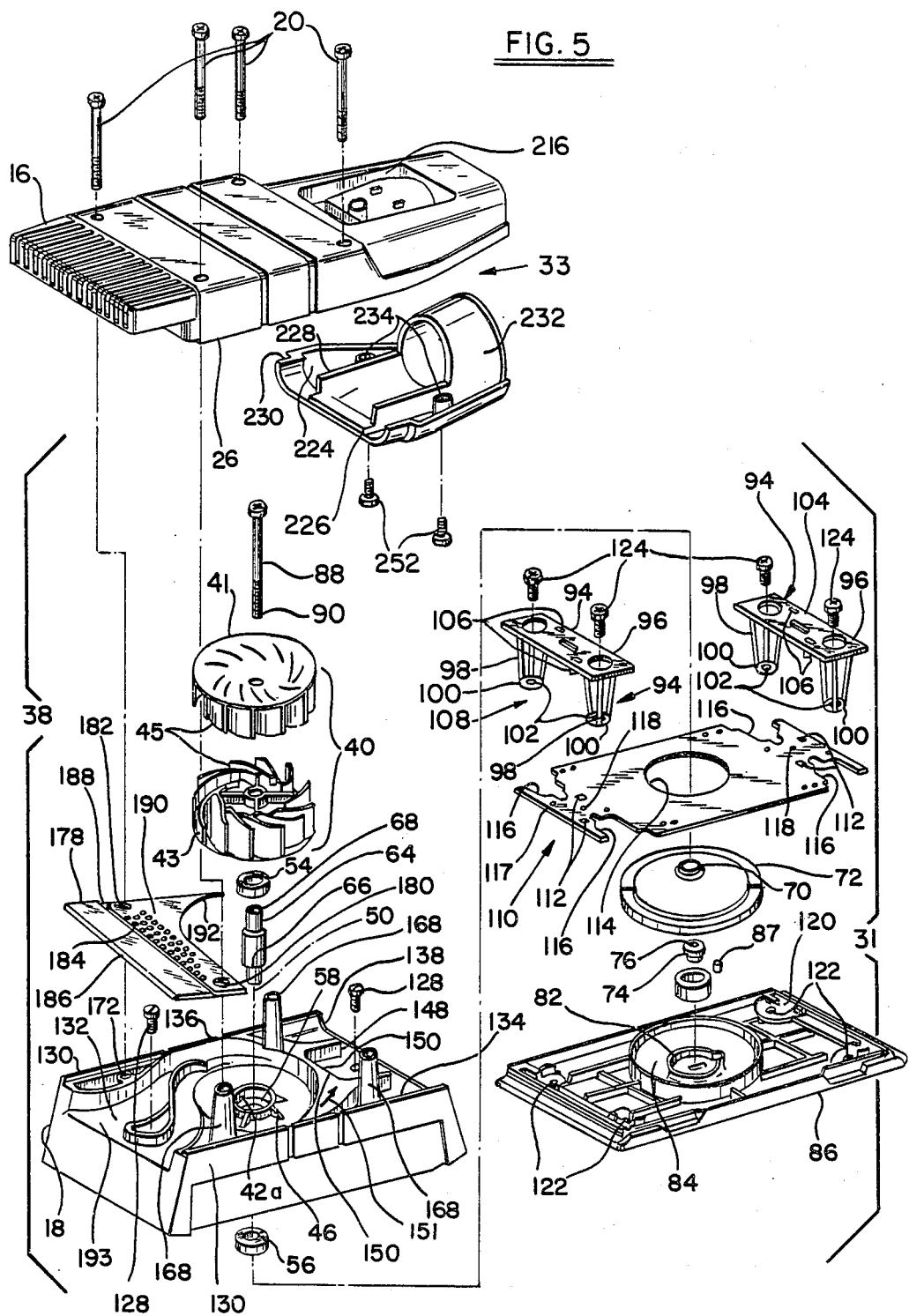
FIG. 5 is an exploded perspective view of the sanding tool, illustrating the interfit of the housing components of the present invention.

Referring to FIGS. 1, 2 and 3, a turbine-powered orbital sander referred to generally as 10 is shown embodying the present invention. A streamlined exterior sander housing assembly 12 includes three one-piece molded plastic members. The first member, an upper handle 4 having a ribbed front handgrip 16, is secured to the second member, a lower housing 18, by fasteners 20. The third member is a tapered vacuum line receptacle 22 mounted beneath the rear of the upper handle 14, and connected to a fitting 24 of an air hose leading to a vacuum source (not shown). The three housing members 14, 18 and 22, are joined along a common boundary 26. A one-piece dust shroud 28 is mounted on the lower housing 18. The dust shroud 28 has a flared portion 30 which is spaced outwardly from platen 32 so that a bottom edge 34 of the shroud 28 is suspended just above worksurface 36.

As shown in FIGS. 4 and 5, housing assembly 12 encloses several systems which coact to produce the present sander 10. A flexible, four-point suspension system 31 supports the sander housing 12, which encloses an easily-assembled interfit system 33. The interfit system 33 defines a set of air chambers 35 which guide air flow to a switching system 37 with a minimum of turbine noise. The switching system 37 permits the operator to quickly engage and disengage a turbine direct drive system 38, without having to connect and disconnect the sander 10 and the fitting 24. When engaged, the drive system 38 interacts with the suspension system 31 to yield the sander's oscillating motion.

The first system to be described is the turbine direct-drive system 38. FIGS. 4 and 5 illustrate a turbine 40 constructed of a turbine upper half 41 interlocked as at 41a with a turbine lower half 43. A plurality of turbine vanes 45 are configured such that air entering the turbine lower half 43 exits from the turbine upper half 41.

The turbine 40 is mounted in the housing assembly 12 using a minimum of components. A hub 42 is formed with an upper hub portion 42a and a lower hub portion 44, which are integrally molded on the lower housing 18. A plurality of upper ribs 46 and lower ribs 48 are also integrally molded on lower housing 18 and provide additional support for hub 42. The hub 42 is located concentrically about a turbine axis 50, and defines a bore 52, also located concentrically about the turbine axis 50. Upper and lower ball bearings 54, 56 are pressed into upper and lower counterbores 58, 60, respectively, in bore 52 such that their respective axes of rotation are coincident with turbine axis 50.

A one-piece thermoplastic shaft 62 has a reduced diameter upper portion 64 and a similar reduced diameter lower portion 66. The shaft 62 defines a longitudinal clearance bore 68. Upper and lower portions 64, 66 are mounted in bearings 54, 56, respectively, such that the longitudinal centerline of clearance bore 68 is coincident with turbine axis 50. The turbine 40 is mounted onto the upper portion 64 of shaft 62; a top 70 of counterweight 72 is mounted onto the lower portion 66. Therefore the one-piece shaft 62 and its support structure provides a rapid alignment of counterweight 72 with turbine 40, along the turbine axis 50.

A bushing 74, shown in FIGS. 4 and 5, having a threaded bore 76 is eccentrically located in a counterweight hub 78. The bushing 74 is also pressed into a counterweight bearing 80, having an axis of rotation coincident with the turbine axis 50. Bearing 80 is mounted in a hub 82 formed on upper surface 84 of a baseplate 86, and is trapped therein by plug 87. Platen 32 is attached to the baseplate 86.

The drive system 38 is assembled by inserting an elongated fastener or machine screw 88 having a threaded end 90 through the turbine 40, clearance bore 68, and counterweight 72, and into threaded engagement with bore 76 of bushing 74. When the screw 88 is tightened, it adds rigidity to the drive system components by placing them in slight compression.

The resultant drive system 38 is now aligned about a single axis 50. As turbine 40 rotates, it rotates shaft 62 and bushing 74, which in turn drives counterweight 72 and baseplate 86, thereby providing an oscillatory sanding motion to platen 32. An abrasive strip or sandpaper is attached to baseplate 86 via clamps 89, which are of conventional designs.

In addition to being connected to the baseplate 86 through the drive system 38 as described above, the lower housing 18 is supported upon the baseplate through the four-point suspension system 31, which provides both support and flexibility so that the suspension system 31 coacts with the drive system 38 to distribute the oribital sanding action about the platen 32.

The suspension system 31 includes two platen support members 94 as best seen in FIG. 5. Each platen support member 94 is a molded plastic body in the shape of an inverted "U" in which a flat cross-member 96 supports at each end a flexible post 98. Post 98 includes a plurality of downwardly extending flexible fingers 99 terminating in a disc 100 having a mounting hole 102. A longitudinal mounting slot 104 is formed in the cross-member 96 midway between each flexible post 98. Two downwardly-extending locking tabs or snaps 106 are formed diagonally between the flexible posts 98 and the mounting slot 104. Again referring to FIG. 5, a suspension subassembly 108 is created when two platen support members 94 are temporarily connected to a mounting member, such as a metal mounting plate 110. The metal mounting plate 110 has four locking apertures 112 so spaced as to receive the snaps 106 of the flexible post pairs 94. The metal mounting plate 110 also includes a central clearance orifice 114, four corners cutouts 116, which extend in pairs towards each other from opposite sides adjacent the end 117 thereof, and a threaded mounting hole 118 formed inwardly of the end 117. The subassembly 108 is completed when the two platen support members 94 are snapped into the apertures 112 of the metal plate 110. The subassembly 108 now can be easily moved to and aligned with the other components of the suspension system 31 and the drive system 38.

During final assembly of the suspension system 31, subassembly 108 is attached to the baseplate 86 and then to the upper housing 18. A raised boss 120, shown in FIGS. 4 and 5, having a threaded aperture 122 is formed at each corner of the upper surface 84 of baseplate 86. A fastener 124 is inserted through each disc mounting hole 102 and into threaded engagement with each aperture 122 of baseplate 86. The subassembly 108 is then positioned against the lower housing 18 such that the cross-member 96 of each platen support member 994 is located in a mating recess 126 formed beneath the lower housing 18, and clearance orifice 114 is placed around ribs 48. Then a pair of fasteners 128 are inserted through the lower housing 18, the mounting slot 104, and into threaded engagement with holes 118 of metal plate 110, the slot 104 enhancing ease of alignment. When fasteners 128 are tightened they secure the platen support members 94 to the lower housing 18 by firmly sandwiching the platen support members 94 between the metal plate 110 and the lower housing 18. The drive system 38 is now axially entrapped therebetween but free to rotate about the axis 50. Nevertheless, when the baseplate 86 is vibrated responsive to the orbital motion of the drive system 38, the flexible posts 98 of the suspension system 31 flex to accomodate such motion, while maintaining the axial distance of the drive system 38.

Having described the drive system 38 and suspension system 31, it is now appropriate to describe how a minimum of housing components interfit to guide and control air flow and to abate turbine noise, thereby powering the drive system 38.

Figure 6:
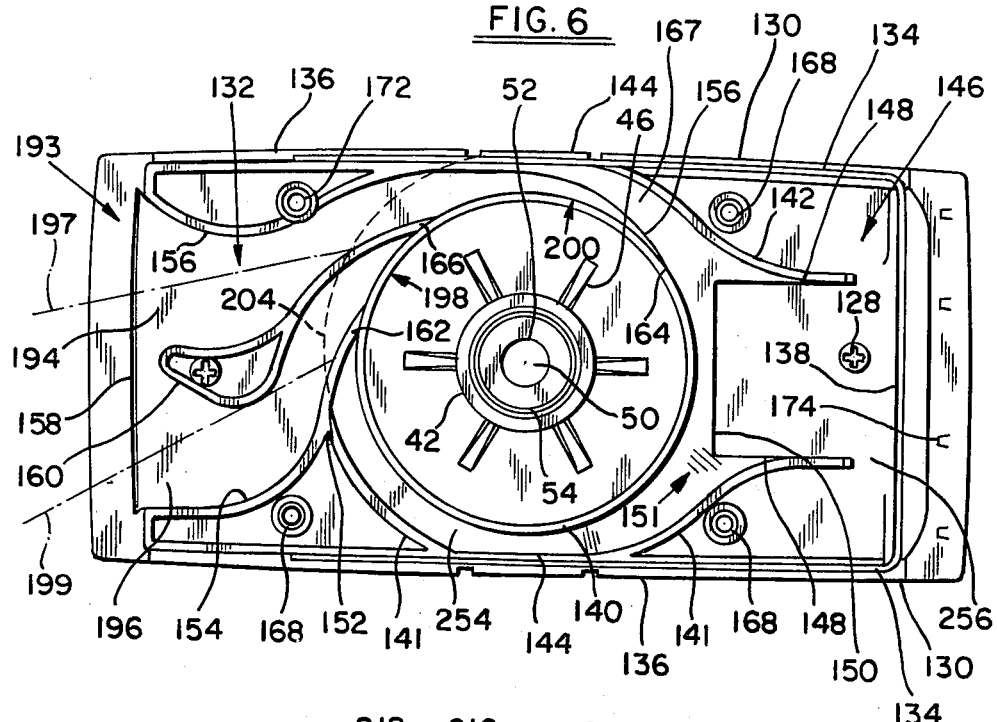
FIG. 6 is a detail plan view of a lower housing member, taken along line 6—6 of FIG. 4.

Referring to FIGS. 4, 5 and 6, the lower housing 18 has two longitudinal integrally-molded exterior walls 130 of uniform height extending from a lower housing floor 132 to the plane of the common boundary 26. A shallow groove 134 is formed in the upper edges 136 of the walls 130 to accomodate a complementary peripheral sealing tongue 137 on upper handle 14. A similar shallow groove 138 is also formed in the floor 132 transverse to and intersecting the groove 134.

As shown in FIG. 6, a circular lower turbine well 140 is formed concentrically about turbine axis 50. Two section 141, 142 of a curved turbine chamber wall merge with the exterior walls 130 at its midpoints 144, and curve inwardly to the exhaust end 146 of the lower housing 18, where they join switch chamber side walls 148. Walls 148 extend transversely to and rearwardly from switch chamber wall 150. The floor 132 slopes upwardly between wall 141 and well 140, as indicated by arrow 151 of FIG. 6. Wall 141 extends forwardly until it reaches junction 152 with a first nozzle wall 154. Nozzle wall 154 and a second nozzle wall 156 form the sides of a turbine air inlet 158 (see FIG. 3). A nozzle air-dividing wall 160 is located generally intermediate the nozzle walls 154, 156. All three nozzle walls 154, 156, 160 describe "S"-shaped paths converging rearwardly of the turbine air inlet 158. Walls 154 and 156 intersect the lower turbine well 140 at junctions 162, 164 respectively. Wall 160 stops at a point 166 on the arc intermediate the intersections 154, 156. A horizontal platform 167 is formed between nozzle wall 156 and turbine chamber wall 142, and merges with upward slope 151 of floor 132.

For strength and ease of alignment and assembly, three upwardly-extending generally conical posts 168 are molded into the floor 132, as shown best in FIG. 5, and make up three support members of the housing interfit system 33. A short boss 172 extends upwardly to approximately the height of nozzle wall 156, as shown in FIGS. 5 and 6.

To complete the structure of lower housing 18 a plurality of vertical ribs 174 are formed on a rear surface 176 of the lower housing 18, thereby supplying additional support for the dust shroud 28.

As shown in FIGS. 4 and 5, a sub-element of the interfit system 33 is a nozzle cover plate 178, in each side of which are formed large and small mounting holes 180, 182, respectively. A plurality of noise attenuation holes 184 are formed in the cover plate 178 generally intermediate the mounting holes 180, 182. Forwardly of the noise attenuation holes 184 is a generally rectangular front section 186, in which is also formed a continuation 188 of the groove 134. A generally arcuate section 190 of the cover plate 178, having a flashed edge 192, extends rearwardly of the noise attenuation holes 184, adjacent the small mounting hole 182.

As shown in FIGS. 5 and 6, when the nozzle cover plate 178 is assembled on the lower housing 18, the large mounting hole 180 is placed over one of the posts 168, the small mounting hole 182 is positioned over boss 172, and flashed edge 192 is placed over points 162, 164 and 166 along the arc of the turbine well 140. Then the cover plate 178 is lowered onto the lower housing 18. The resultant structure is an inlet nozzle 193 having two channels 194, 196 which direct air to two entrances 198, 200 respectively, along the lower turbine well 140. The flashed edge 192 provides an air seal at the entrances 198, 200. The inlet nozzle 193 is one element of a turbine noise attenuation subsystem, shown generally as 195 in FIG. 4. It has been learned that providing a single air inlet channel to a turbine does not necessarily reduce turbine noise at the inlet, and merely providing several air inlet channels yields only a small improvement.

However, it was discovered that by providing two inlet channels 194, 196, as shown in FIG. 6, and by configuring them to break the lines of sight 197, 199 (FIG. 6) from the turbine air inlet 158 to the turbine entrances 200, 198 respectively, a significant noise reduction at the inlet 158 resulted. The nozzle 193 incorporates this discovery through its "S"-shaped configuration. Also, by converging the channels 194, 196, air is accelerated before it impacts turbine 40, thereby improving turbine efficiency.

Referring to FIGs. 4 and 6 another interfit member is upper handle 14, which includes a second element of the noise attenuation subsystem 195. Handle 14 defines a generally circular wall 202, which follows a continuous contour traced by turbine chamber walls 141, 142 and the curve (in phantom) 204. Now referring to FIG. 4, adjacent the handgrip 16, a rectangular side branch resonator 206 is located between the circular wall 202 and exterior wall 208. A downwardly-extending post (not shown), similar to the upwardly extending posts 168, is recessed in the upper handle 14 adjacent the side branch resonator 206, such that it complements boss 172 of lower housing 18. This post is the fourth support member for the interfit system 33.

As shown in FIG. 4, when the upper handle 14 is assembled to the lower housing 18, the side branch resonator 206 is positioned over the noise attenuation holes 184 of the inlet nozzle 193. The vanes 45 of the turbine 40 generate sound having a fundamental frequency $F_T$ and a corresponding wavelength $\lambda_T$. The resonator 206 has a width extending the entire width of the nozzle 193, and a depth $D_T$ related to the wavelength $\lambda_T$. For example, $D_T$ can be a multiple or a fraction of $\lambda_T$, such one-half $\lambda_T$, one-quarter $\lambda_T$, etc. In the preferred embodiment $D_T$ is selected to be one quarter $\lambda_T$. The side branch resonator is thereby sized to cancel sound waves emitted by turbine vanes 45. The noise attenuation holes 184 and side branch resonator 206 coact to minimize turbine noise; this combination in turn coacts with the inlet noise-attenuating nozzle 193 to provide the turbine noise attenuation subsystem 195.

Figure 7:
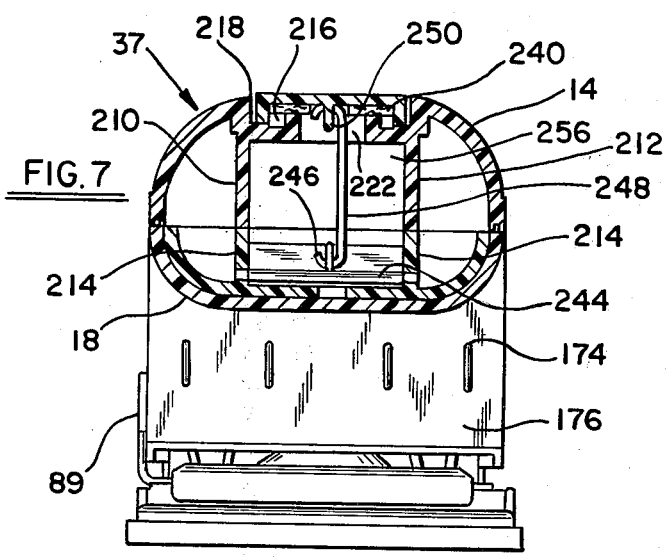
FIG. 7 is a rear elevational view, partly in section, taken along line 7—7 of FIG. 4.

The interfit system 33 also provides structure for mounting the switching system 37. Referring to FIGS. 4 and 7, wall 202 extends rearwardly, becoming two parallel upper switch chamber walls 210, 212. Between each wall 202, 210 and wall 202, 212, is located a downwardly-extending tab 214.

Now referring to FIGS. 4, 5 and 7, a toggle well 216 is formed in the upper surface 218 of the upper handle 14. Toggle pivot brackets 220 are formed in each side of the toggle well 216, and a bypass aperture 222 is located in well 216 forwardly of the toggle pivot brackets 220. Two downwardly-extending internally threaded posts 217 are located between walls 210 and the outer wall of upper handle 14.

Referring to FIG. 5, the final element of the interfit system 33 is the tapered receptacle 22, which includes a clamshell base 224 upon which are formed walls 226, 228. A stepped portion 230 is located forwardly of walls 226, 228. An integral tapered hoop portion 232 extends upwardly and rearwardly of the walls 226, 228 and is sized to tightly accommodate air hose fitting 24 (FIGS. 1 and 2). Two hollow bosses 234 extend upwardly between the walls 226, 228 and the clamshell base 224.

Again as shown FIG. 4, the switching system 37 includes a toggle lever 238 pivotally mounted on brackets 220 such that its upper surface is flush with the upper surface of upper handle 14. The toggle lever 238 is marked "on" at its forward position, and "off" at its rearward position (FIG. 2). Referring to FIG. 7, a felt gasket 240 is mounted on the underside of the toggle lever 238 above the bypass aperture 222, serving as an air seal. A coil spring 241 between the upper handle 14 and the toggle lever 238 normally biases the switch 236 "off", as shown in phantom in FIG. 4. A flap valve 242 has a integral pivot rod 244 at its rearmost end, and is pivotally connected at 246 to a connecting rod 248, which itself is pivotally connected at 250 to the toggle lever 238.

To assemble the interfit system 33 the switching system 37 is mounted in the upper handle 14 such that the flap valve pivot rod 244 is located immediately below tabs 214. Tapered receptacle 22 is then positioned such that pivot rod 244 is trapped between tabs 214 and stepped portion 230, hollow bosses 234 are adjacent posts 217, and hoop portion 232 is nested within the rear of the upper handle 14. As shown in FIG. 5 fasteners 252 complete the connection between the upper handle 14 and tapered receptacle 22. The upper handle 14 is then positioned above lower housing 18 such that resonant chamber 206 is above the holes 184 in nozzle cover plate 178, the downwardly extending post (not shown) is placed immediately above small mounting hole 182, and stepped portion 230 of the tapered receptacle 22 covers rear groove 138. Fasteners 20 are then inserted through the upper handle 14 downwardly into the small mounting hole 182 and the three vertical posts 168, threadedly engaging mounting plate 110.

Referring to FIGS. 4, 5, and 6 the complete interfit system 33 provides a quickly-assembled, sealed set of air chambers, as follows: The upper handle wall 202 mates with lower housing walls 141, 142 to form a turbine chamber 254. Walls 210, 212 of the upper handle 14 mate with walls 148 of the lower housing 18 and walls 214 of the receptacle 22; together with wall 150, the resultant structure forms a valve chamber 256.

In operation, when the sander is connected to a vacuum source, and toggle lever 238 is depressed "on", air travels inwardly through nozzle passages 194, 196 into the turbine chamber 254. As air drives turbine 40, the air moves upwardly and is exhausted through valve chamber 256, into the vacuum source. As seen in FIG. 6 the slope 151 in the floor 132 provides a "scavenging" effect in the turbine chamber 254, as follows: If any air collects in pockets in the turbine chamber, the airflow from the turbine chamber 254 is guided upwardly along slope 151 to the valve chamber 256 and breaks up the pockets or prevents their formation, thereby improving the tool's efficiency. When lever 238 is turned "off", air enters through the bypass aperture 222, flap valve 242 is closed, and the turbine 40 stops.

It will be understood that various changes in the details, materials, arrangements of parts and operating conditions which have been herein described and illustrated in order to explain the nature of the invention may be made by those skilled in the art within the principles and scope of the invention.

What is claimed is:

1. A housing for a turbine-driven tool, comprising:
   (a) a first one-piece housing member having a first turbine chamber wall and a first valve chamber wall;
   (b) a second one-piece housing member defining a nozzle having two opposing walls, and having a second turbine chamber wall and a second valve chamber wall;
   (c) the first one-piece housing member being connected to the second one-piece housing member with the first and second turbine chamber walls forming a turbine chamber and the first and second valve chamber walls forming a valve chamber;
   (d) the nozzle and the valve chamber being adjacent to and connected with the turbine chamber;
   (e) connecting means for fastening the first housing member to the second housing member to simultaneously provide alignment and structural support for the housing members;
   (f) the connecting means including a first elongated support member extending from the second housing member adjacent one of the two opposing nozzle walls and being received within the first housing member;
   (g) the connecting means further including a fastener connecting the first housing member to the second housing member via the first elongated support member;
   (h) a removable nozzle cover plate located adjacent the nozzle and having a first mounting aperture, and having a rear portion sandwiched between the first and second housing members;
   (i) the nozzle cover plate being located upon the second housing member such that the first elongated support member is insertable through the first mounting aperture;
   (j) the nozzle cover plate rear portion having a curved flashed portion providing an air seal adjacent the nozzle connection with the turbine chamber; and
   (k) the nozzle cover plate further including a plurality of noise attenuation holes.

2. The combination claimed in claim 1, further comprising a tongue and groove seal between the nozzle cover plate and the first housing member.

3. A housing for a turbine-driven tool, comprising:
   (a) a first one-piece housing member having a first turbine chamber wall and a first valve chamber wall;
   (b) a second one-piece housing member defining a nozzle having two opposing walls, and having a second turbine chamber wall and a second valve chamber wall;
   (c) the first one-piece housing member being connected to the second one-piece housing member with the first and second turbine chamber walls forming a turbine chamber and the first and second valve chamber walls forming a valve chamber;
   (d) the nozzle and the valve chamber being adjacent to and connected with the turbine chamber;
   (e) a removable nozzle cover plate located adjacent the nozzle and having a first mounting aperture, a second mounting aperture, and having a rear portion sandwiched between the first and second housing members;
   (f) connecting means for fastening the first housing member to the second housing member to simultaneously provide alignment and structural support for the housing members;
   (g) the connecting means including a first elongated support member extending from the second housing member adjacent one of the two opposing nozzle walls and being received within the first housing member, and a second elongated support member extending from the first housing member adjacent the other of the two opposing nozzle walls;

(h) the connecting means further including a fastener connecting the first housing member to the second housing member via the first elongated support member;

(i) the second elongated support member being operatively associated with the second mounting aperture of the nozzle cover plate; and (j) the nozzle cover plate being located upon the second housing member such that the first elongated support member is insertable through the first mounting aperture.

4. A nozzle for a turbine-driven tool having a housing and a turbine chamber formed fin the housing, comprising:

(a) a turbine air inlet formed in the housing;

(b) means for conveying air from the turbine air inlet to the turbine chamber to eliminate a straight line of sight from the turbine air inlet to the turbine, said means including two channels, each channel connecting the turbine air inlet to the turbine chamber;

(c) the two channels including a base integral with the housing and lying in a plane, first and second curved nozzle walls and a curved nozzle air-dividing wall, said walls being integrally connected to the base;

(d) the first and second nozzle walls being mounted transverse to the plane of the base, defining two sides, respectively, of the nozzle, and following converging paths to the turbine chamber;

(e) the nozzle air-dividing wall being mounted transverse to the plane of the base and being located generally intermediate the first and second nozzle walls;

(f) the first and second nozzle walls and the nozzle air-dividing wall intersecting the turbine chamber;

(g) a turbine axis transversely intersecting the plane of the nozzle base;

(h) a turbine chamber wall being radially curved about the turbine axis transverse to the plane of the nozzle base;

(i) a one-piece removable nozzle cover plate removably engaging, and transverse to, the first and second nozzle walls and the nozzle air-dividing wall; and (j) the nozzle cover plate including a curved portion approximately complementary to the curvature of the circumference of the turbine, and further including a plurality of sound-attenuating holes.

5. A noise attentuation system for a turbine powered tool, comprising:

(a) a first housing member defining a turbine chamber and a turbine air inlet;

(b) a second housing member connected to the first housing member;

(c) a turbine having turbine vanes and being rotatably mounted in the turbine chamber;

(d) first means connecting the turbine air inlet to the turbine chamber for attenuating turbine air inlet noise, including a nozzle having means for interrupting the line of sight from the turbine air inlet to the turbine chamber;

(e) second means operatively associated with the first means, for attenuating turbine vane noise, and including a resonating chamber formed in the second housing member;

(f) the nozzle including two curved chambers beginning adjacent the turbine air inlet and convergingly terminating at the turbine chamber, and including a removable nozzle cover plate; and (g) means for communicating the resonating chamber with the nozzle, including a plurality of noise attenuating holes formed in the nozzle cover plate.

6. The combination claimed in claim 5, wherein:

(a) the turbine vanes generating sound having a wavelength;

(b) the resonating chamber having a predetermined depth; and (c) the depth being related to the wavelength of the sound generated by the turbine vanes.

7. The combination claimed in claim 6, wherein the depth of the resonating chamber being approximately equal to one-quarter the wavelength of the sound generated by the turbine vanes.

* * * * *